United States Patent
Thorson

(10) Patent No.: US 7,333,797 B2
(45) Date of Patent: Feb. 19, 2008

(54) METHOD AND APPARATUS FOR CALL SET UP IN A WIRELESS COMMUNICATION SYSTEM THAT PERMITS A SHARING OF MOBILE IDENTIFIERS

(75) Inventor: Dean E. Thorson, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 41 days.

(21) Appl. No.: 10/948,351

(22) Filed: Sep. 23, 2004

(65) Prior Publication Data
US 2006/0073834 A1    Apr. 6, 2006

(51) Int. Cl.
*H04M 1/66*    (2006.01)
(52) U.S. Cl. .................. 455/410; 455/450; 455/515
(58) Field of Classification Search ................ 455/411, 455/558, 410, 416, 435, 445, 415, 450, 458, 455/452.1, 515
See application file for complete search history.

(56) References Cited

U.S. PATENT DOCUMENTS

| | | | | |
|---|---|---|---|---|
| 5,467,382 A | * | 11/1995 | Schorman | .......... 455/410 |
| 5,953,654 A | * | 9/1999 | Li | .......... 455/411 |
| 6,026,295 A | * | 2/2000 | Okada | .......... 455/416 |
| 6,295,446 B1 | * | 9/2001 | Rocha | .......... 455/410 |
| 6,466,777 B1 | * | 10/2002 | Urita | .......... 455/410 |
| 6,522,886 B1 | | 2/2003 | Youngs et al. | |
| 6,775,546 B1 | | 8/2004 | Fuller | |
| 7,013,131 B2 | * | 3/2006 | Lee et al. | .......... 455/415 |
| 2003/0125072 A1 | | 7/2003 | Dent | |
| 2004/0180676 A1 | | 9/2004 | Haumont et al. | |
| 2004/0185888 A1 | | 9/2004 | Serge | |
| 2005/0070249 A1 | * | 3/2005 | Lee | .......... 455/410 |

* cited by examiner

*Primary Examiner*—Duc M Nguyen
*Assistant Examiner*—Eric J Elcenko
(74) *Attorney, Agent, or Firm*—Steven May

(57) ABSTRACT

A communication system reduces a likelihood that a call is set up with a wrong mobile station (MS) when a same Mobile Identification Number (MIN) is shared by multiple MSs by allocating duplicate physical layer parameters to each MS. In response to receiving a call, the system pages an MS. When the system receives a first page response from the first MS and a second page response from a second MS due to a shared MIN, the system allocates multiple duplicate physical layer parameters to each MS. The system then conveys a first channel assignment to the first MS and a second channel assignment to the second MS, wherein each channel assignment identifies the allocated multiple physical layer parameters. By allocating duplicate physical layer parameters to each MS, the intended MS is able to successfully set up a communication session regardless of an order of conveyance of the channel assignments.

14 Claims, 6 Drawing Sheets

100

-PRIOR ART-

- PRIOR ART -

METHOD AND APPARATUS FOR CALL SET UP IN A WIRELESS COMMUNICATION SYSTEM THAT PERMITS A SHARING OF MOBILE IDENTIFIERS

FIELD OF THE INVENTION

The present invention relates generally to wireless communication systems, and more specifically to a method and apparatus for call set up in a wireless communication system that permits a sharing Mobile Identification Number assignments.

BACKGROUND OF THE INVENTION

In wireless communication systems of the prior art, a Mobile Identification Number (MIN) is assigned to each cellular phone, or user, that is present in the system. The MIN is akin to a phone number and is used by the communication system to identify and communicate with the individual user. Unfortunately, when a user changes his or her cellular phone, the MIN often is re-used in the new phone. If the user chooses to leave both the new and the old phones powered-on, then both phones will respond when a network of the communications system pages the user by transmitting a page that identifies the user's MIN. The first phone to respond to the page is then granted access to the network while the second is blocked. Since the new phone and the old phone are equally likely to respond to the page, the old phone may end up blocking the new phone's access to the network.

For example, FIGS. 1 and 2 illustrate an exemplary call setup messaging sequence of the prior art. FIG. 1 is a block diagram of a wireless communication system 100 of the prior art. Communication system 100 includes a first mobile station (MS) 102, a second MS 104, a Base Station (BS) 106 that provides wireless communication services to MSs 102 and 104, and a Mobile Switching Center (MSC) 108 coupled to BS 106. A same MIN is shared by the two mobile stations, that is, MS 102 and MS 104, and is maintained by each MS in a respective memory device of the MS, such as a removable memory device such as a Subscriber Identity Module (SIM). For example, a user may have purchased a new phone, such as MS 104, that the user uses to make calls but keeps an old phone, such as MS 102, to look up stored contact information that the user does not want to, or cannot, transfer to the new phone.

FIG. 2 is a signal flow diagram 200 of an exemplary call setup messaging sequence executed by communication system 100. Signal flow diagram 200 begins when BS 106 receives a call intended for a user of MSs 102 and 104, and more particularly for MS 104, and broadcasts a Page Message 202 that is intended for MS 104. Page Message 202 includes the MIN associated with MS 104, which MIN identifies MS 104 as a target of the page. However, as the MIN is shared among MS 102 and MS 104, MS 102 will also recognize the MIN and believe that it is the target of the page.

When each of MS 102 and MS 104 receives Page Message 202, the MS determines if the MIN included in Page Message 202 matches a MIN stored in the memory device of the MS. When each of MS 102 and MS 104 determines that there is a match, then the MS responds to the Page Message by conveying a Page Response Message 204, 206 to the BS that includes an Electronic Serial Number (ESN) that is uniquely associated with the MS. For example, suppose MS 102 receives page message 202 prior to MS 104. MS 102 determines that there is a match and conveys a Page Response Message 204 to BS 106 that includes an ESN uniquely associated with MS 102. Similarly, when MS 104 receives Page Message 202 and determines that there is a match, MS 104 conveys a Page Response Message 206 to BS 106 that includes an ESN that is uniquely associated with MS 104. However, Page Response Message 206 is conveyed subsequent to the conveyance of Page Response Message 204.

When BS 106 receives Page Response Message 204 from MS 102, MSC 108 validates MS 102 based on the received ESN and the BS transmits an acknowledgement (BS ACK Order 208) acknowledging receipt of Page Response Message 204. BS 106 allocates a first forward link traffic channel to MS 102 and transmits a Channel Assignment Message (CAM) 212 that identifies a first Walsh Code associated with the first forward link traffic channel and that further identifies MS 104 by including the MIN associated with MS 104. In a Code Division Multiple Access (CDMA) communication system, a forward link traffic channel is defined by multiple spreading codes, including a Walsh Code and a long code that is based on a long code mask corresponding to the ESN of the MS that is allocated the channel.

Similarly, when BS 106 receives Page Response Message 206 from MS 104, MSC 108 validates MS 104 based on the received ESN and BS 106 transmits an acknowledgement (BS ACK Order 210) acknowledging receipt of Page Response Message 206. BS 106 allocates a second forward link traffic channel to MS 104 and transmits a CAM 214 that identifies a second Walsh Code associated with the second forward link traffic channel and that further identifies MS 104 by including the MIN associated with MS 104. However, CAM 214 is transmitted subsequent to the transmission of CAM 212.

Both MS 102 and MS 104 receive CAM 212. Each of MS 102 and MS 104 then determines that it is the intended recipient of the CAM by matching the MIN included in the CAM to the MIN maintained by the MS. Upon determining that there is a match, each MS then tunes to the forward link traffic channel identified in CAM 212, that is, the first forward link traffic channel, based on the first Walsh Code identified in the CAM and the long code based on the MS's ESN. As only MS 102 is aware of the correct ESN, and therefore the correct long code mask, associated with the first Walsh Code and the first forward link traffic channel, only MS 102 can successfully despread the identified forward link traffic channel. MS 102 then performs traffic channel initialization procedures 216 with BS 106, the forward link traffic channel is established between MS 102 and the BS, and MS 102 performs remaining signaling 218 for the setup of the call with the BS via the established traffic channel.

Meanwhile, MS 104 is unable to demodulate the first forward link traffic channel because MS 104 despreads first forward link traffic channel the using a long code based on a wrong ESN. However, MS 104 also misses CAM 214 because the MS has ceased listening for a CAM after receiving CAM 212. When MS 104 fails to arrive on the second forward link traffic channel within a predetermined period of time, the second forward link traffic channel is released and the attempt to set up a call with MS 104 is deemed unsuccessful. As a result, the call is set up with the old phone, that is, MS 102, but is not set up with the new phone, that is, MS 104.

Therefore, a need exists for a method and apparatus that reduces a likelihood that a call is set up with a wrong phone when a sharing of a MIN is permitted in a wireless communication system.

DETAILED DESCRIPTION OF THE INVENTION

To address the need for a method and apparatus that reduces a likelihood that a call is set up with a wrong phone when a sharing of a Mobile Identification Number (MIN) is permitted in a wireless communication system, a communication system reduces a likelihood that a call is set up with a wrong mobile station (MS) when a same Mobile Identification Number (MIN) is shared by multiple MSs by allocating duplicate physical layer parameters. In response to receiving a call intended for a first MS, the communication system pages the MS. When the communication system receives a first page response from the first MS and further receives a second page response from a second MS due to a dual MIN assignment, the communication system allocates multiple duplicate physical layer parameters to each of the first and second MSs. The communication system then conveys a first channel assignment to the first MS and a second channel assignment to the second MS, wherein each channel assignment identifies multiple identical physical layer parameters. By allocating multiple duplicate physical layer parameters to each MS, the intended MS is able to successfully set up a communication session regardless of an order of conveyance of the channel assignments.

Generally, an embodiment of the present invention encompasses a method for setting up a wireless call. The method includes receiving a call intended for a first mobile station (MS) and paging the first MS. The method further includes receiving a first response to the page from the first MS and a second response to the page from a second MS and allocating a same multiple physical layer parameters to each MS of the first MS and the second MS. The method further includes conveying a first channel assignment in association with the multiple physical layer parameters allocated to the first MS and conveying a second channel assignment in association with the multiple physical layer parameters allocated to the second MS.

Another embodiment of the present invention encompasses a base station comprising a processor that receives a call intended for a first MS, pages the first MS, receives a first response to the page from the first MS and a second response to the page from a second MS, allocates a same multiple physical layer parameters to each of the first MS and the second MS, conveys a first channel assignment in association with the multiple physical layer parameters to the first MS, and conveys a second channel assignment in association with the multiple physical layer parameters to the second MS.

Figure 1:
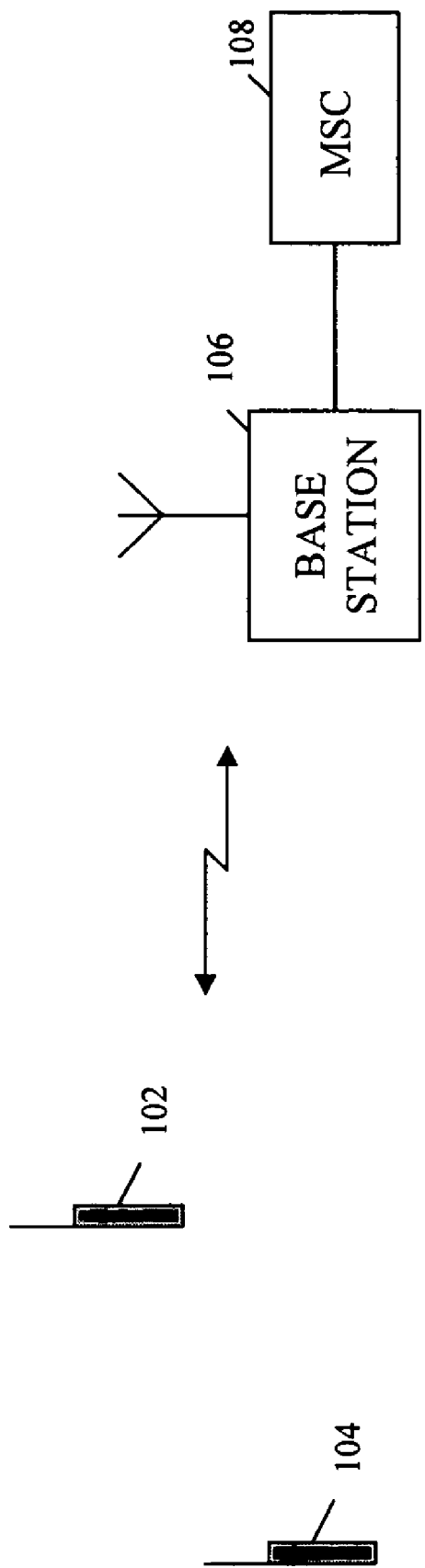
FIG. 1 is a block diagram of a wireless communication system of the prior art.
Figure 2:
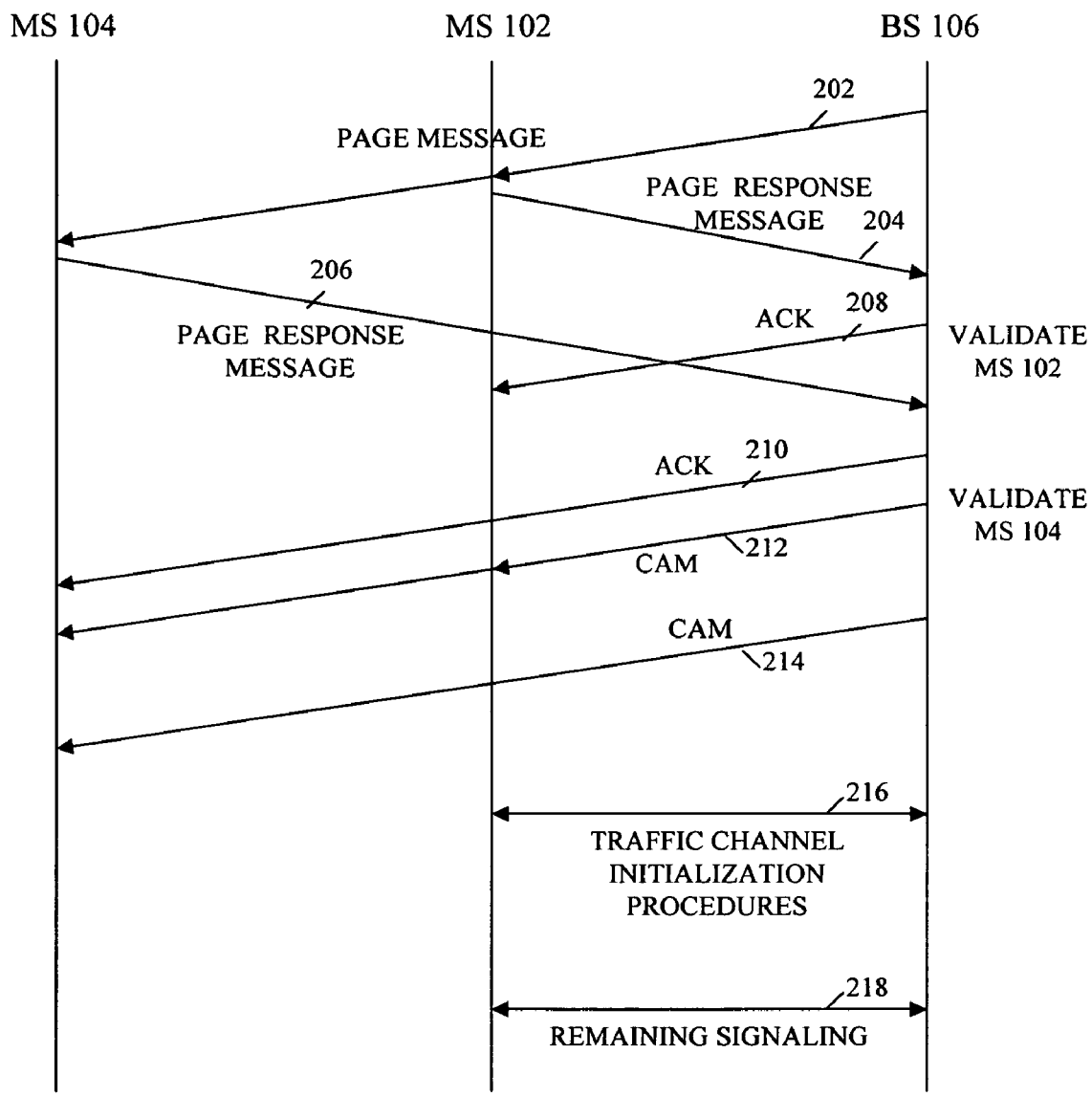
FIG. 2 is a signal flow diagram of a call setup messaging sequence executed by the communication system of FIG. 1.
Figure 3:
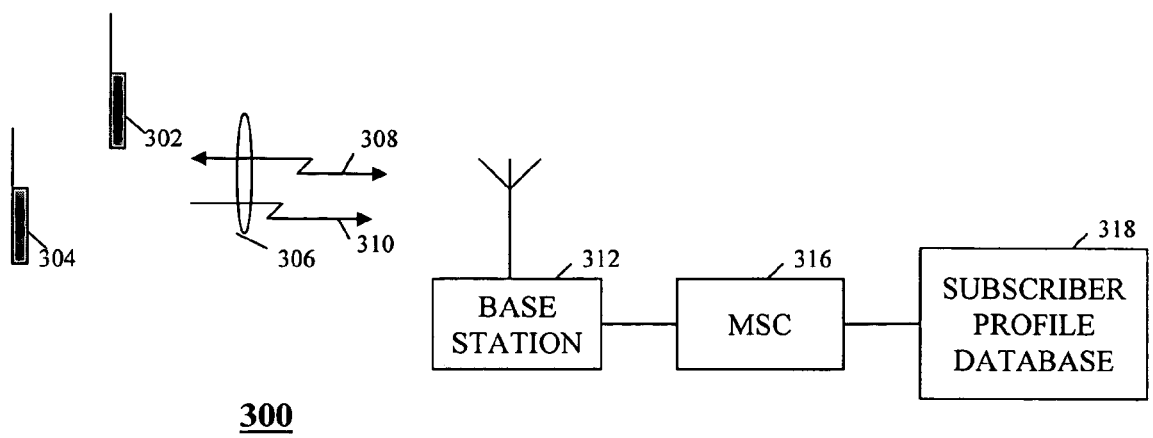
FIG. 3 is a block diagram of a wireless communication system in accordance with an embodiment of the present invention.

The present invention may be more fully described with reference to FIGS. 3-6C. FIG. 3 is a block diagram of a wireless communication system 300 in accordance with an embodiment of the present invention. Communication system 300 includes at least one Base Station (BS) 312 coupled to a Mobile Switching Center (MSC) 316. Typically, a BS such as BS 312 comprises at least one transceiver (not shown), such as a Base Transceiver Station (BTS), that is operationally coupled to a network controller (not shown), such as a Base Station Controller (BSC). Communication system 300 further includes a subscriber profile database 318 that is operationally coupled to, or included in, MSC 316. Together, BS 312, MSC 316, and subscriber profile database 318 are collectively referred to herein as a network of communication system 300.

Communication system 300 further includes multiple mobile stations (MSs) 302, 304 (two shown) that reside in a coverage area, such as cell or a sector, of BS 312 that is serviced by the BS. However, in another embodiment of the present invention, each MS of the multiple MSs 302, 304 may be serviced by a different BS. One of ordinary skill in the art realizes that each MS 302, 304 may be any of, but not limited to, a cellular telephone, a radio telephone, a personal digital assistant (PDA) with radio frequency (RF) capabilities, or a wireless modem that provides an RF interface for digital terminal equipment (DTE) such as a laptop computer. BS 312 provides communications services to MSs 302 and 304 via an air interface 306 that includes a forward link 308 and a reverse link 310. Forward link 308 preferably includes a paging channel, multiple forward link control channels, and multiple forward link traffic channels. Reverse link 310 preferably includes an access channel, multiple reverse link control channels, and multiple reverse link traffic channels.

Subscriber profile database 318 maintains a subscriber profile for each MS of the multiple MSs 302, 304 in communication system 300. Each subscriber profile includes a mobile identifier (mobile ID), such as a Mobile Identification Number (MIN) and/or an identifier derived from the MIN, assigned to the corresponding MS by communication system 300 and used by the communication system to communicate with the MS. Each subscriber profile further includes a mobile serial number, preferably an Electronic Serial Number (ESN), that is inherent to, and uniquely associated with, the corresponding MS. Subscriber profile database 318 further maintains and tracks provisioning and mobility information with respect to each MS 302, 304, including registration of the MS when the MS activates in communication system 100.

Preferably, communication system 300 is a Code Division Multiple Access (CDMA) communication system that operates in accordance with at least one of the CDMA, cdma2000 and TIA/EIA (Telecommunications Industry Association/Electronic Industries Association) IS-95B, IS-2000, IS-2000-A, IS-2000-B, IS-2000-C, IS-2000-D, and IS-2001-C (v1.0) standards, which provide a compatibility standards for CDMA (Code Division Multiple Access) and cdma2000 communication systems, including IS-2001 air interfaces. The standards specify wireless telecommunications system operating protocols, including radio system parameters and call processing procedures. In a CDMA communication system such as communication system 300, the communication channels of a forward link 308 or a reverse link 310, such as access channels, control channels, paging channels, and traffic channels, comprise orthogonal spreading codes that may be transmitted in a same frequency bandwidth.

Figure 4:
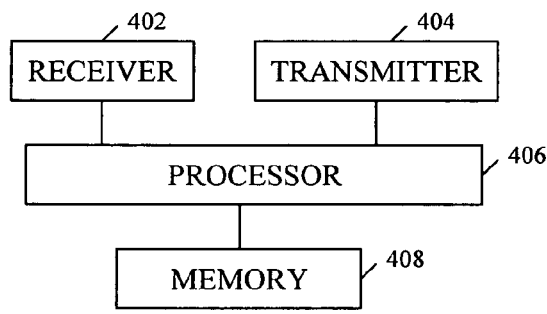
FIG. 4 is a is a block diagram of a mobile station of FIG. 3 in accordance with an embodiment of the present invention.
Figure 5:
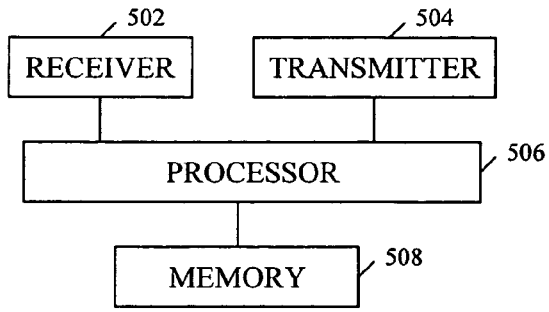
FIG. 5 is a is a block diagram of a base station of FIG. 3 in accordance with an embodiment of the present invention.

Referring now to FIGS. 4 and 5, each of MSs 302 and 304 and BS 312 includes a respective processor 406, 506, such as one or more microprocessors, microcontrollers, digital signal processors (DSPs), combinations thereof or such other devices known to those having ordinary skill in the art. Each of MSs 302 and 304 and BS 312 further includes a respective at least one memory device 408, 508, associated with the respective processor, such as random access memory (RAM), dynamic random access memory (DRAM), and/or read only memory (ROM) or equivalents thereof, that maintains data and programs that may be executed by the processor and that allow the processor to operate in communication system 100. Each MS 302, 304 further maintains, in the at least one memory device 408 of the MS, the mobile ID assigned to a user of the MS by communication system 300 and the mobile serial number that is uniquely associated with the MS. Each MS 302, 304 belongs to a same user and is associated with, and maintains, a same mobile ID as the other MS. However, the mobile serial number associated with, and maintained by, each MS 302, 304 is unique to the MS and is, therefore, different from the mobile serial number maintained by the other MS.

Each of MSs 302 and 304 and BS 312 further includes a receiver 402, 502 and a transmitter 404, 504 that are operationally coupled to their respective processor 406, 506 and that provide for receiving and transmitting messages by the MS and BS. Unless otherwise specified herein, all functions described as being performed herein by an MS 302, 304, or BS 312 is performed by the respective processor 406, 506 of the MS or BS. When BS 312 includes one or more BTSs and a BSC, the functions described herein as being performed by processor 506 may be performed by a BTS serving MSs 302 and 304, by the BSC, or may be distributed among the serving BTS and the BSC.

Figure 6A:
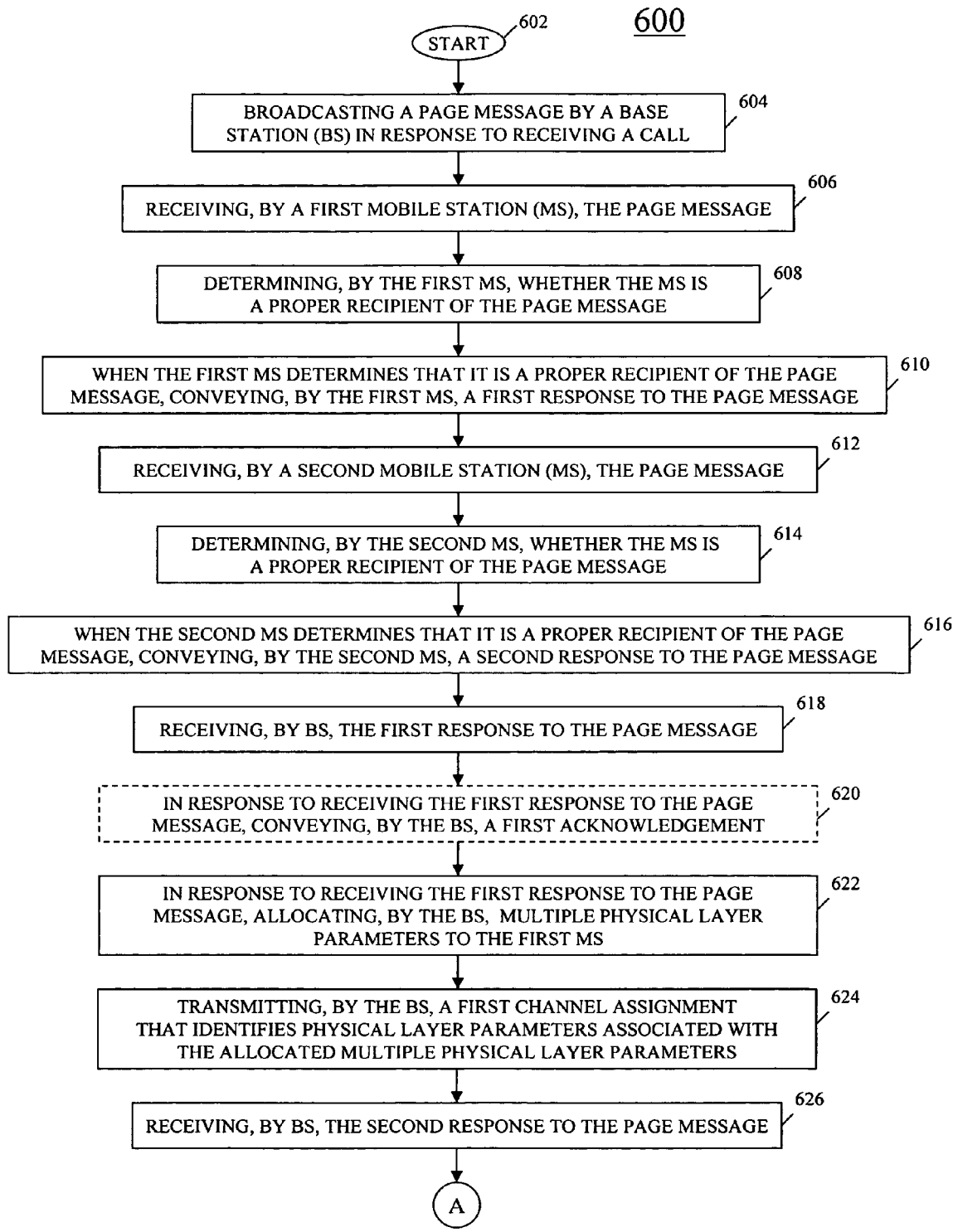
FIG. 6A is a is a logic flow diagram of a call setup messaging sequence executed by the communication system of FIG. 3 in accordance with an embodiment of the present invention.
Figure 6B:
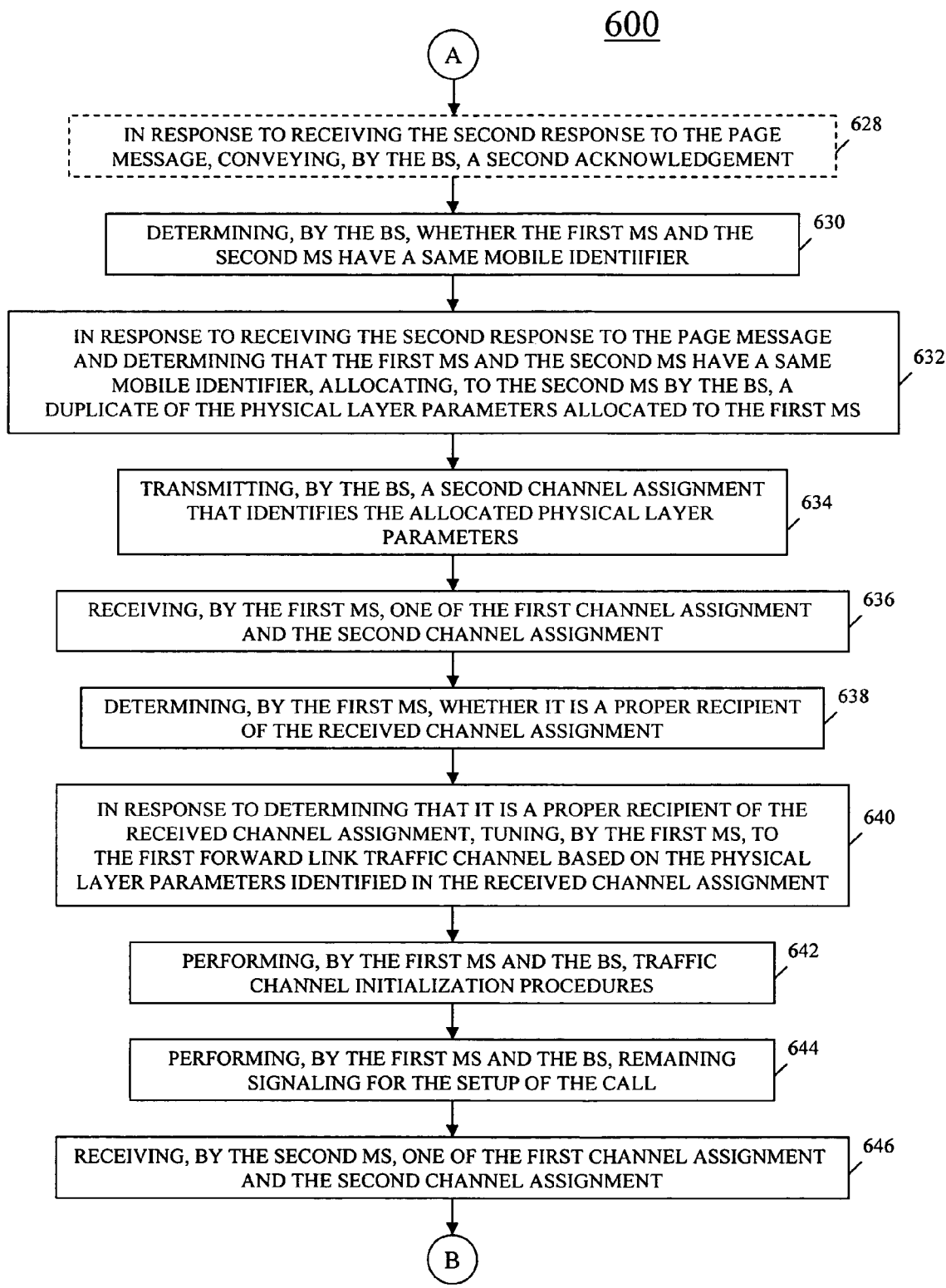
FIG. 6B is a continuation of the logic flow diagram of FIG. 6A depicting a call setup messaging sequence executed by the communication system of FIG. 3 in accordance with an embodiment of the present invention.
Figure 6C:
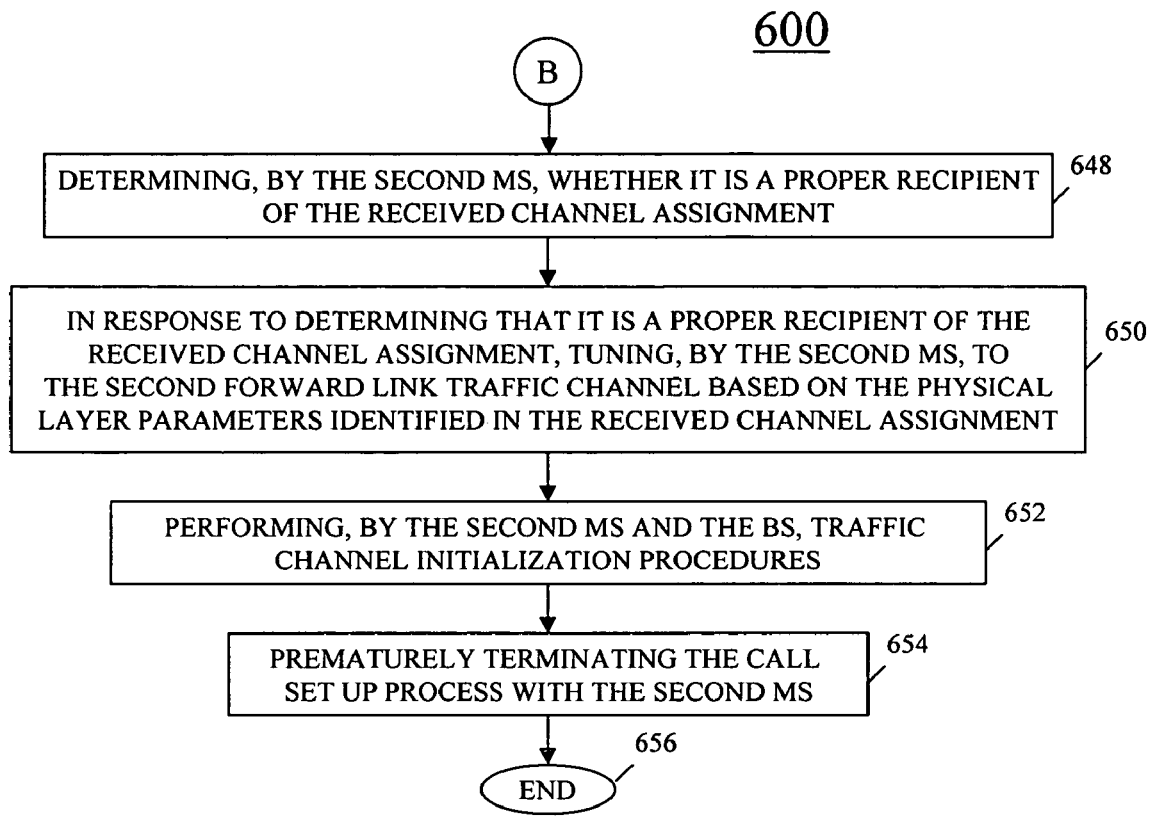
FIG. 6C is a continuation of the logic flow diagrams of FIGS. 6A and 6B depicting a call setup messaging sequence executed by the communication system of FIG. 3 in accordance with an embodiment of the present invention.

Referring now to FIGS. 6A, 6B, and 6C, a logic flow diagram 600 is depicted that illustrates a call setup messaging sequence executed by communication system 300 in accordance with an embodiment of the present invention. Signal flow diagram 600 begins (602) when BS 312 receives a call intended for one of MSs 302 and 304, and more particularly a user of the multiple MSs 302, 304, and broadcasts (604) a page message, preferably a 'Page Message,' via the paging channel. The page message includes the mobile ID associated with MSs 302 and 304, which mobile ID identifies the user of MSs 302 and 304, and more particularly MSs 302 and 304, as targets of the page. One may note, for reasons of security, that it undesirable to broadcast a mobile serial number.

When each of MS 302 and MS 304 receives the page message, the MS determines whether it is a proper recipient of the page message, that is, whether the mobile ID included in the page message matches the mobile ID stored in the memory device of the MS. When each of MS 302 and MS 304 determines that there is a match, then the MS responds to the page message by conveying, to BS 312, a response to the page, preferably a 'Page Response Message' and preferably via the access channel, that includes the mobile serial number that is uniquely associated with the MS. For example, when a first MS of the multiple MSs, that is, MS 302, receives (606) the page message and determines (608) that it is a proper recipient of the page message, that is, that there is a match, then MS 302 conveys (610) a first response to the page to BS 312 that includes mobile identity information, such as MS 302's mobile serial number, maintained by MS 302. Similarly, when a second MS of the multiple MSs, that is, MS 304, receives (612) the page message and determines (614) that it is a proper recipient of the page message, that is, that there is a match, then MS 304 conveys (616) a second response to the page, preferably a second 'Page Response Message' and preferably via the access channel, to BS 312 that includes mobile identity information, such as MS 304's mobile serial number, maintained by MS 304.

When BS 312 receives (618) the first response to the page from MS 302, the BS conveys the received mobile identity information to MSC 318. Based on the received mobile identity information, the MSC validates MS 302 and so informs BS 312. BS 312 may transmit (620) a first acknowledgement, such as a BS ACK Order, to MS 302 acknowledging receipt of the first response to the page. Further, in response to the validation of MS 302, BS 312 allocates (622) a matrix comprising multiple physical layer parameters to MS 302, such as a Walsh code, a Frame Offset, and/or a CDMA Frequency, to MS 302 associated with a first forward link traffic channel. BS 312 then transmits (624) a first channel assignment, preferably a first Channel Assignment Message (CAM) and preferably via the paging channel, that identifies the allocated physical layer parameters and that further identifies MS 304 by including the mobile ID associated with MS 304. In communication system 300, each forward link traffic channel is defined by, among other parameters, multiple spreading codes, including a Walsh Code and a long code that is based on a long code mask corresponding to the mobile serial number of the MS that is allocated the channel.

Similarly, when BS 312 receives (626) the second response to the page from MS 304, the BS conveys the received identity information to MSC 316. Based on the received mobile identity information, the MSC validates MS 304 and so informs BS 312. BS 312 may transmit (628) a second acknowledgement, such as a BS ACK Order, acknowledging receipt of second response to the page. Further, in response to the validation of MS 304, BS 312 determines (630) whether the mobile ID associated with MS 304 is the same as the mobile ID associated with MS 302. Preferably, BS 312 determines whether the mobile IDs match by comparing the mobile identity information contained in the second response to the page with an internal database of mobile identity information associated with each MS serviced by BS 312 and maintained by the BS in at least one memory device 508, when call setup is in progress on the BS. When BS 312 determines that the same mobile ID is associated each of MS 304 and MS 302, the BS intentionally duplicates (632) the multiple physical layer parameters allocated to MS 304 and MS 302 by intentionally allocating physical layer parameters, such as a Walsh code, a Frame Offset, and/or a CDMA Frequency, to MS 304 that are the same as the physical layer parameters allocated to MS 302. That is, BS 312 allocates a second forward link traffic channel to MS 304 that comprises physical layer parameters that are the same as the physical layer parameters associated with the first forward link traffic channel allocated to MS 302. BS 312 then transmits (634) a second channel assignment, preferably a second CAM and preferably via the paging channel, that identifies the allocated physical layer parameters and that further identifies MS 304 by including the mobile ID associated with MS 304.

When MS 302 receives (636) either the first channel assignment or the second channel assignment, the MS determines (638) whether it is a proper recipient of the received channel assignment, that is, determines whether the mobile ID included in the channel assignment matches the mobile ID maintained by the MS. It makes no difference which channel assignment is received by the MS as both the first channel assignment and the second channel assignment identify the same physical layer parameters. In response to determining that there is a match, MS 302 then tunes (640) to the first forward link traffic channel based on the physical layer parameters identified in the channel assignment and the mobile serial number of MS 302. As the same physical layer parameters have been allocated to both MS 302 and MS 304, MS 302 is able to successfully despread the first forward link traffic channel based on the physical layer parameters, such as a Walsh Code and a long code mask, corresponding to the mobile serial number of MS 302. MS 302 then performs (642) traffic channel initialization procedures with BS 312, the first forward link traffic channel is established between MS 302 and the BS, and MS 302 performs (644) remaining signaling for the setup of the call with the BS via the established traffic channel and completes the call setup process.

Similarly, when MS 304 receives (646) either the first channel assignment or the second channel assignment, the MS determines (648) that it is a proper recipient of the received channel assignment, that is, determines whether the mobile ID included in the channel assignment matches the mobile ID maintained by the MS. Again, it makes no difference which channel assignment is received by the MS as both the first channel assignment and the second channel assignment identify the same physical channel parameters. In response to determining that there is a match, MS 304 then tunes (650) to the second forward link traffic channel based on the physical layer parameters identified in the channel assignment and the mobile serial number of MS 304. As the same physical layer parameters has been allocated to both MS 302 and MS 304, MS 304 is able to successfully despread the second forward link traffic channel based on the physical layer parameters, such as a Walsh Code and a long code mask, corresponding to the mobile serial number of MS 304. MS 304 then performs (652) traffic channel initialization procedures with BS 312, the second forward link traffic channel is established between MS 302 and the BS, and BS 312 prematurely terminates (654) the call set up process with MS 304 by conveying an instruction, preferably a Release Order, to MS 304 via the second forward link traffic channel to release the second forward link traffic channel prior to completion of the call setup process. As is known in the art, a conveyance of a Release Order is typically determined through an execution of known procedures in an MSC, such as MSC 316, which compares the mobile identity information received in the first and second page responses to desired mobile identities to determine if an illegal MS is operating. If the MSC determines that an illegal MS is responding to a page, then the MSC sends a release to the MS through known procedures. Logic flow 600 then ends (656).

The above logic flow assumes that the user of MSs 302 and 304 wishes to use MS 302 to complete the call. However, one of ordinary skill in the art realizes that present invention further encompasses, and the above logic flow may also be applied, to an embodiment where the user of MSs 302 and 304 wishes to use MS 304 to complete the call, except that actions comprising steps 644 and 654 would be swapped, that is, step 644 would comprise terminating the call and step 654 would comprise performing remaining signaling and completing setup of the call.

By allocating duplicate physical layer parameters to each MS of multiple MSs 302, 304 that respond to a page, communication system 300 resolves a problem where multiple MSs share a MIN and, due to the shared MIN, an unintended recipient of the page blocks an intended recipient of the page from setting up a communication session. That is, in the prior art, when each of multiple MSs shares a MIN and one of the multiple MSs is paged, each of the multiple MSs will respond. Each of the multiple MS is then assigned a different communication channel and is informed of the assigned communication channel via a channel assignment message. When a first MS of the multiple MSs processes a channel assignment message intended for a second MS of the multiple MSs due to the shared MIN, the first MS may unsuccessfully attempt to demodulate the communication channel assigned to the second MS and further miss the channel assignment message intended for itself. To resolve this problem, communication system 300 allocates a physical layer matrix comprising duplicate physical layer parameters to each MS that shares a MIN. As a result, when a first MS of the multiple MSs processes a channel assignment message intended for a second MS of the multiple MSs due to the shared MIN, the first MS will be able to successfully demodulate a forward link traffic channel based on the physical layer parameters identified by the message. If the first MS is the intended recipient of the page, then a call setup is permitted. If the first MS is not the intended recipient of the page, then the call setup is terminated.

One of ordinary skill in the art realizes that where the term Page Message is used herein, this message may comprise a Page Message, General Page Message, or any other message that a network may use to page an MS and request the MS to contact the network. Similarly, where the term Page Response Message is used herein, this message may comprise a Page Response Message or any other message that is used by a mobile station to respond to a network page. Also, where the term Channel Assignment Message is used herein, this message may comprise a Channel Assignment Message, an Enhanced Channel Assignment Message, or any other message that is used to inform an MS of a channel assignment. Also, where the disclosure uses the terms MS ACK Order and BTS ACK Order, these messages may comprise the actual order messages, representative Link Access Control ping messages, or any other message that perform that function. Finally, where the term Release Order is used herein, this message may be an actual order message or may be any other message that instructs an MS to release a traffic channel.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for setting up a wireless call comprising:
receiving a call intended for a first mobile station;
paging the first mobile station;
receiving a first response to the page from the first mobile station and a second response to the page from a second mobile station;
maintaining mobile identity information in association with each of the first mobile station and the second mobile station;
determining that a same mobile identifier is associated with each of the first mobile station and the second mobile station;
in response to receiving the first and second responses and determining that a same mobile identifier is associated with each of the first mobile station and the second mobile station, allocating a same plurality of physical layer parameters to each mobile station of the first mobile station and the second mobile station;
conveying a first channel assignment in association with the plurality of physical layer parameters allocated to the first mobile station; and
conveying a second channel assignment in association with the plurality of physical layer parameters allocated to the second mobile station.

2. The method of claim 1,
wherein determining that a same mobile identifier is associated with each of the first mobile station and the second mobile station comprises comparing mobile identity information included in the second response to the page with the mobile identity information maintained in association with each of the first mobile station and the second mobile station.

3. The method of claim 1, further comprising:
receiving, by the first mobile station, the first channel assignment;
successfully despreading, by the first mobile station, a first traffic channel based on the plurality of physical layer parameters;
receiving, by the second mobile station, the first channel assignment; and
successfully despreading, by the second mobile station, a second traffic channel based on the plurality of physical layer parameters.

4. The method of claim 3, further comprising:
establishing a first traffic channel with the first mobile station;
establishing a second traffic channel with the second mobile station;
completing a call setup with one of the first mobile station and the second mobile station; and
prematurely terminating the call setup process with the other mobile station.

5. The method of claim 1, further comprising:
receiving, by the first mobile station, the second channel assignment;
successfully despreading, by the first mobile station, a first traffic channel based on the plurality of physical layer parameters;
receiving, by the second mobile station, the second channel assignment; and
successfully despreading, by the second mobile station, a second traffic channel based on the plurality of physical layer parameters.

6. The method of claim 5, further comprising:
establishing a first traffic channel with the first mobile station;
establishing a second traffic channel with the second mobile station;
completing a call setup with one of the first mobile station and the second mobile station; and
prematurely terminating the call setup process with the other mobile station.

7. The method of claim 1, further comprising:
establishing a first traffic channel with the first mobile station;
establishing a second traffic channel with the second mobile station;
completing a call setup with one of the first mobile station and the second mobile station; and
prematurely terminating the call setup process with the other mobile station.

8. The method of claim 1, wherein the page comprises a mobile identifier associated with both the first mobile station and the second mobile station.

9. The method of claim 8, further comprising:
maintaining the mobile identifier by the first mobile station; and
maintaining the mobile identifier by the second mobile station.

10. The method of claim 9, farther comprising:
receiving, by the first mobile station, the page;
determining, by the first mobile station, that the mobile identifier included in the page matches the mobile identifier maintained by the first mobile station;
in response to determining a match by the first mobile station, conveying, by the first mobile station, the first response to the page;
receiving, by the second mobile station, the page;
determining, by the second mobile station, that the mobile identifier included in the page matches the mobile identifier maintained by the second mobile station; and
in response to determining a match by the second mobile station, conveying, by the second mobile station, the second response to the page.

11. A base station comprising at least one memory device that maintains mobile identity information in association with each of a first mobile station and a second mobile station and a processor that receives a call intended for the first mobile station, pages the first mobile station, receives a first response to the page from the first mobile station and a second response to the page from the second mobile station, determines that a same mobile identifier is associated with each of the first mobile station and the second mobile station, in response to receiving the first and second responses and determining that a same mobile identifier is associated with each of the first mobile station and the second mobile station, allocates a same plurality of physical layer parameters to each of the first mobile station and the second mobile station, conveys a first channel assignment in association with the plurality of physical layer parameters allocated to the first mobile station, and conveys a second channel assignment in association with the plurality of physical layer parameters allocated to the second mobile station.

12. The base station of claim 11, wherein the processor determines a same mobile identifier is associated with each of the first mobile station and the second mobile station by comparing the mobile identity information contained in the second response to the page with the mobile identity information maintained in the at least one memory device.

13. The base station of claim 11, wherein the page comprises a mobile identifier associated with both the first mobile station and the second mobile station.

14. The base station of claim 11, wherein the processor further establishes a first traffic channel with the first mobile station, establishes a second traffic channel with the second mobile station, completes a call setup with one of the first mobile station, and prematurely terminates the call setup process with the other mobile station.

* * * * *